United States Patent
McGee et al.

(10) Patent No.: US 7,649,892 B2
(45) Date of Patent: Jan. 19, 2010

(54) METHOD AND SYSTEM OF NETWORK COMMUNICATION RECEIVE LOAD BALANCING

(75) Inventors: Michael Sean McGee, Austin, TX (US); Jeffrey D. Allen, Atlanta, GA (US); Mark C. Stratton, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 421 days.

(21) Appl. No.: 11/468,615

(22) Filed: Aug. 30, 2006

(65) Prior Publication Data

US 2008/0056132 A1  Mar. 6, 2008

(51) Int. Cl.
H04L 12/28 (2006.01)
(52) U.S. Cl. .................................................. 370/395.4
(58) Field of Classification Search ................. 370/238, 370/238.1, 242, 245, 249, 256; 709/202, 709/226
See application file for complete search history.

(56) References Cited

U.S. PATENT DOCUMENTS

| | | | |
|---|---|---|---|
| 6,493,318 B1 * | 12/2002 | Bare | 370/238 |
| 6,535,491 B2 * | 3/2003 | Gai et al. | 370/256 |
| 6,560,630 B1 * | 5/2003 | Vepa et al. | 718/105 |
| 6,963,576 B1 | 11/2005 | Lee | |
| 7,072,293 B2 | 7/2006 | Hunter et al. | |
| 7,143,196 B2 | 11/2006 | Rimmer et al. | |
| 2003/0097415 A1 | 5/2003 | Laux et al. | |
| 2003/0179707 A1 | 9/2003 | Bare | |
| 2005/0270980 A1 | 12/2005 | McGee | |
| 2006/0013224 A1 * | 1/2006 | Chiba | 370/389 |
| 2006/0029097 A1 | 2/2006 | McGee et al. | |
| 2006/0034190 A1 | 2/2006 | McGee et al. | |
| 2006/0251106 A1 | 11/2006 | Nakagawa et al. | |
| 2007/0177594 A1 | 8/2007 | Kompella | |
| 2007/0201490 A1 * | 8/2007 | Mahamuni | 370/395.54 |
| 2007/0233810 A1 | 10/2007 | Brownell et al. | |
| 2008/0056120 A1 | 3/2008 | Jha et al. | |
| 2008/0151807 A1 | 6/2008 | Meier et al. | |
| 2009/0135821 A1 | 5/2009 | Kobayashi | |

OTHER PUBLICATIONS

Cisco Software COnfiguration Guide Release 7.2.*
Stratton et al., Office Action dated Apr. 6, 2009, U.S. Appl. No. 11/468,499, filed Aug. 30, 2006.
Stratton et al., Final Office Action dated Sep. 3, 2009, U.S. Appl. No. 11/468,499, filed Aug. 30, 2009.

* cited by examiner

Primary Examiner—Chirag G Shah
Assistant Examiner—Amarnauth Persaud

(57) ABSTRACT

A method and system of network communication receive load balancing. At least some of the illustrative embodiments are methods comprising determining communication path cost information by a computer system (the computer system coupled to plurality of clients over a network), configuring communications from the plurality of clients to the computer system such that the communications are distributed across a plurality of teamed communication ports (the distribution proportional to communication path cost information associated with each communication port), and receiving message packets distributed across the plurality of teamed communication ports.

18 Claims, 6 Drawing Sheets

METHOD AND SYSTEM OF NETWORK COMMUNICATION RECEIVE LOAD BALANCING

BACKGROUND

In order to implement communication fault tolerance, and in some cases increase data throughput, a computer system may couple to a network by way of a plurality of communication ports (hereinafter just ports), with the ports either implemented on a single network interface card (NIC) or the ports implemented on multiple NICs. The communication ports are "teamed" such that, regardless of the actual number of ports, the ports appear as a single port to application level programs.

In some cases, a primary port both sends and receives all communication packets, with the non-primary ports idled until such time as the primary port experiences a fault. In the case of a fault, one of the non-primary ports becomes primary, and the new primary sends and receives all communication packets. In other cases, regardless of which port is primary, message packets from clients on the network are distributed across the ports. Distribution of client-sourced message packets may be by operation of the switch or router to which the computer system couples (switch-assisted load balancing), or the distribution may be implemented by actions of software of the computer system.

In some cases the computer system software-based distribution of client-sourced message packets is by virtue of a software driver intercepting computer system responses to address resolution protocol (ARP) messages, and selective assigning media access control (MAC) addresses such that each client is given a particular port with which to communicate; however, MAC address assignments (and therefore port assignments) to each client by a software driver intercepting the ARP messages does not take into account the ever changing state of the attached network, especially where ports couple to the network through different switch or router devices.

BRIEF DESCRIPTION OF THE DRAWINGS

For a detailed description of illustrative embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
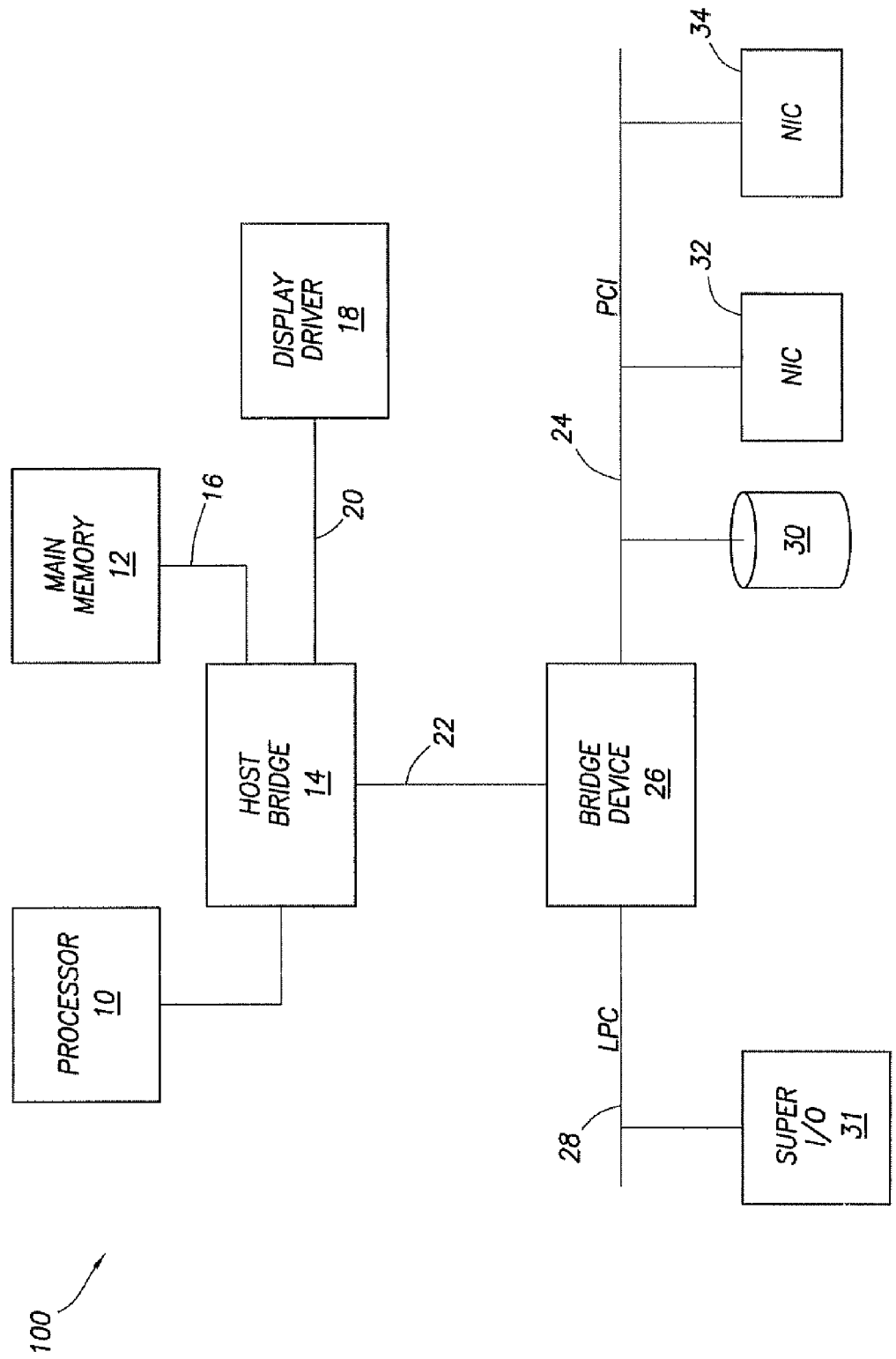
FIG. 1 illustrates a computer system in accordance with at least some embodiments.

FIG. 1 illustrates a computer system 100 in accordance with at least some embodiments. In particular, computer system 100 comprises at least one processor 10. In alternative embodiments the computer system 100 comprises multiple processors arranged in a configuration where parallel computing may take place. The processor 10 couples to a main memory array 12, and a variety of other peripheral computer system components, through a host bridge logic 14, although in some embodiments the host bridge logic 14 may be integrated with the processor 10. The main memory array 12 couples to the host bridge logic 14 through a memory bus 16. The host bridge logic 14 controls transactions to the main memory 12 by asserting control signals during memory accesses. The main memory 12 functions as the working memory for the processor 10 and comprises a memory device or array of memory devices in which program instructions and data are stored. The main memory array 12 may comprise any suitable type of memory, such as Dynamic Random Access Memory (DRAM) or any of the various types of DRAM devices such as Synchronous DRAM (SDRAM), Extended Data Output DRAM (EDO DRAM), or Rambus™ DRAM (RDRAM).

In some embodiments, text and video generated by software executing on the processor is provided to a display driver device 18 coupled to the host bridge 14 by way of an Advanced Graphics Port bus 20, PCI-Express, or other suitable type of bus. Alternatively, the display driver device could couple to the primary expansion bus 22 or one of the secondary expansion buses (i.e., the peripheral component interconnect (PCI) bus 24). The display device to which the display driver device 18 couples may comprise any suitable electronic display device upon which any image or text can be represented. In embodiments where the computer system 100 is a server system (e.g., in rack mounted enclosure with a plurality of other server systems), the display driver 18 may be omitted.

Computer system 100 also comprises a second bridge logic device 26 that bridges the primary expansion bus 22 to various secondary buses, such as a low pin count (LPC) bus 28, the PCI bus 24, and a Universal Serial Bus (USB). These secondary expansion buses are only illustrative, and other secondary expansion buses and bus protocols now in existence, or after-developed, may be equivalently used. In some embodiments, the bridge logic device 26 is an Input/Output (I/O) Controller Hub (ICH) manufactured by Intel Corporation. In the embodiments shown in FIG. 1 using an I/O Controller Hub as the second bridge logic device, the primary expansion bus 22 is a Hub-link bus, which is a proprietary bus of the Intel Corporation. However, computer system 100 is not limited to any particular chipset vendor, and thus other suitable buses as well as chipsets from other manufacturers may be equivalently used.

A Super Input/Output (I/O) controller 31 couples to the second bridge logic device 26 and controls many system functions. The Super I/O controller 31 may interface, for example, with a system pointing device, such as a mouse, a keyboard, and various serial ports and floppy drives. The Super I/O controller is referred to as "super" because of the many I/O functions it may perform. Because in some embodiments the computer system 100 is a server, the server may not have a dedicated mouse and keyboard.

Still referring to FIG. 1, the computer system 100 may further comprise a long term data storage device, such as disk drive system 30 coupled to the bridge logic device 26 by way of the illustrative PCI bus 24. The disk drive system 30 may be a single drive, or an array of drives operated as a redundant array of independent (or inexpensive) disks (RAID) system. While the illustrative disk drive system 30 is shown as coupled to the PCI bus 24, the disk drive system may equivalently couple to other buses, such as the primary expansion bus 22 or other secondary expansion buses.

The computer system 100 further comprises a plurality of network interface cards (NICs) or other form of network adapters. In the illustrative case of FIG. 1, the computer system 100 comprises NICs 32 and 34. The NICs 32 and 34 are message interfaces between the computer system 100 and one or more communication networks, such as an Ethernet network implementing a local area network (LAN) or wide area network (WAN). While FIG. 1 illustrates both NICs 32 and 34 coupled to the same PCI bus 24, in alternative embodiments the NICs may couple to different PCI buses, or buses having different communication protocols (e.g., one NIC coupled to the PCI bus, and a second NIC coupled to the primary expansion bus 22) to implement bus fault tolerance. Each NIC 32 and 34 implements at least one communication port, and each NIC may implement multiple communication ports. For example, a NIC may implement four or eight communication ports, and thus a NIC may implement four or eight separately controllable interfaces to four or eight different communication networks.

In accordance with some embodiments, two or more communication ports (hereinafter just "ports") may be grouped or teamed for purposes of fault tolerance and/or to increase communication throughput. Teamed ports may be implemented on the same NIC device, or the ports may span multiple NIC devices. Moreover computer system 100 may implement multiple teams. Teamed ports represent redundant links to the communication network, and in some cases each port may communicate over distinct paths or segments of the network that ultimately couple to a core switch.

If employed in a packet-switched network, each of the NICs 32 and 34 of FIG. 1 transmit to and receive from the network packets (e.g., Ethernet® formatted packets) generated by clients on the network. The formatting of the packets is defined by the implemented transmission protocol. Each device on a network uses one or more unique addresses by which it communicates with the other devices on the network, with each address (corresponding to one of the layers of the OSI model) embedded in the packets for both the source device and the destination device. A device uses an address at layer 2 (the data link layer) known as a media access control (MAC) address and an address at layer 3 (the network layer) known as a protocol address (e.g., Internet Protocol (IP), IP eXchange (IPx), AppleTalk). The MAC address can be thought of as being assigned to the physical hardware of the device, such as the NIC, whereas the protocol address is assigned to the software of the device. When multiple protocols reside on the same network device, a protocol address is usually assigned to each resident protocol.

For Ethernet networks, devices communicate directly using their respective layer 2 MAC addresses, even though the software for each device initiates communication with one or more other network devices using their protocol addresses. Ethernet devices first ascertain the MAC address corresponding to a particular protocol address of a destination device. For the IP protocol, this is accomplished by first consulting a cache of MAC address/protocol address pairs maintained by each network device. If an entry for a particular protocol address is not present, a process is initiated whereby the sending device broadcasts a request to all devices on the network requesting that the device having the destination protocol address reply with its MAC address. This is known as address resolution protocol (ARP) request, the result of which is then stored in the cache. Communication packets are formed by embedding the source and destination MAC addresses (48 bits each), as well as embedding the source and destination protocol addresses, in the payload of the packet. The source protocol address indicates to the receiving device the identity of the source device from which the packet was received and thus to which device to respond if a response is required. For the IPx protocol, the ARP process is not needed as the MAC address is a constituent of the IPx address.

Figure 2:
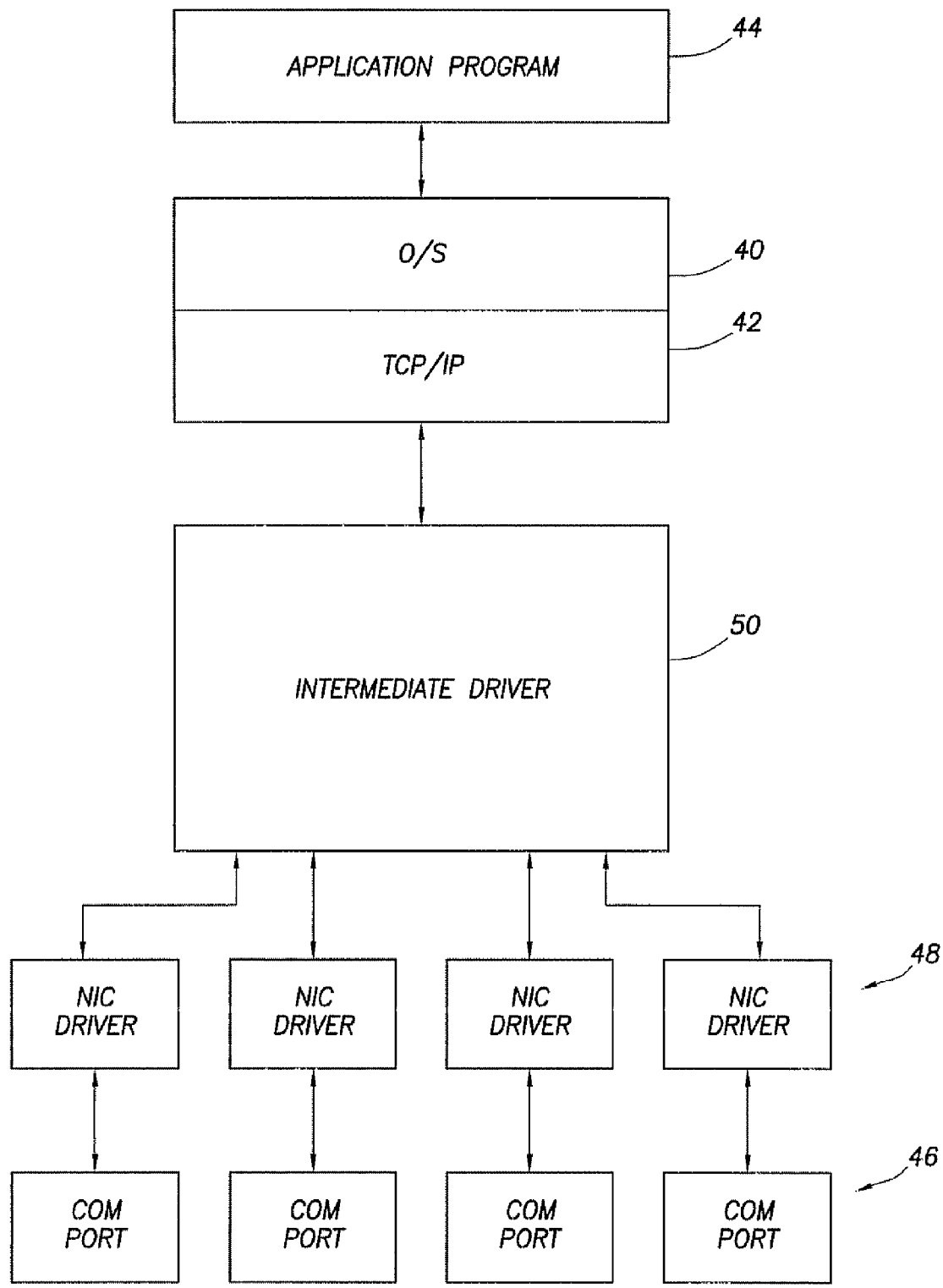
FIG. 2 illustrates the relationship of various software programs and/or drivers in accordance with some embodiments.

FIG. 2 illustrates the relationship of various pieces of software executed by the processor 10 to implement teaming in accordance with at least some embodiments. In particular, the computer system implements an operating system (O/S) 40 that supports networking. Any currently available or after developed operating system that supports networking may be used. In the illustrative case of FIG. 2, the operating system 40 supports a transmission control protocol/internet protocol (TCP/IP) stack 42, but other communication protocols may be implemented simultaneously or in the alternative (e.g., IPx, NetBUEI). The operating system 40, and in particular the illustrative TCP/IP protocol stack 42, enable one or more application programs 44 to communicate to other computer systems over a network.

Still referring to FIG. 2, each communication port 46 has associated therewith a NIC driver 48 (where each NIC driver may be alternatively referred to as a miniport driver). In cases where each NIC (e.g., NICs 32 and 34 of FIG. 1) are made by the same vendor and have the same capabilities, the NIC drivers 48 may be duplicate programs. However, the NICs need not be made by the same vendor or have the same capabilities. For example, one NIC may implement 100 megabit per second (Mbps) data throughput, while another NIC may implement 1000 Mbps (Gigabit) throughput, and in these alternative embodiments the NIC drivers may be vendor and/or capability specific. In spite of having different vendors and/or different capabilities, the various NICs, or their ports, may still be teamed in accordance with embodiments of the invention.

In situations where each port 46 operates independently, the illustrative TCP/IP stack 42 communicates directly with each NIC driver 48; however, in accordance with embodiments of the invention the communications ports 46 are teamed such that they appear as a single communication port to the TCP/IP stack 42 and application program 44. To enable teaming, an intermediate driver 50 interfaces between the illustrative TCP/IP stack 42 and the various drivers 48. More particularly, the intermediate driver 50 communicates with the TCP/IP stack 42, and appears to the TCP/IP stack as a single NIC driver. Likewise, the intermediate driver 50 appears as a TCP/IP stack to each of the NIC drivers 48. Operation of the intermediate driver 50 to implement receive load balancing is introduced with respect to FIG. 3, after a brief discussion of receive load balancing.

In the related art, receive load balancing (i.e., distribution of messages packets among the various teamed ports) of client-sourced messages may be implemented by way of a switch device immediately upstream of the computer system 100. As the client-sourced messages arrive at the switch device, the switch device, implementing an algorithm, distributes the messages across the various ports. However, not all switch devices have load balancing capability. Moreover, having all teamed ports coupled to a single switch device makes the switch device a single point of network failure, and thus provides no switch device redundancy. Various embodiments, discussed more fully below, address the switch redundancy issue by coupling various ports of a set of teamed ports to different switch devices. While such a configuration provides switch redundancy, such a system negates the possibility of having a switch device perform receive load balancing across the entire team. In order to address this concern, various embodiments of the invention implement receive load balancing of client-sourced messages by operation of the intermediate driver 50.

Figure 3:
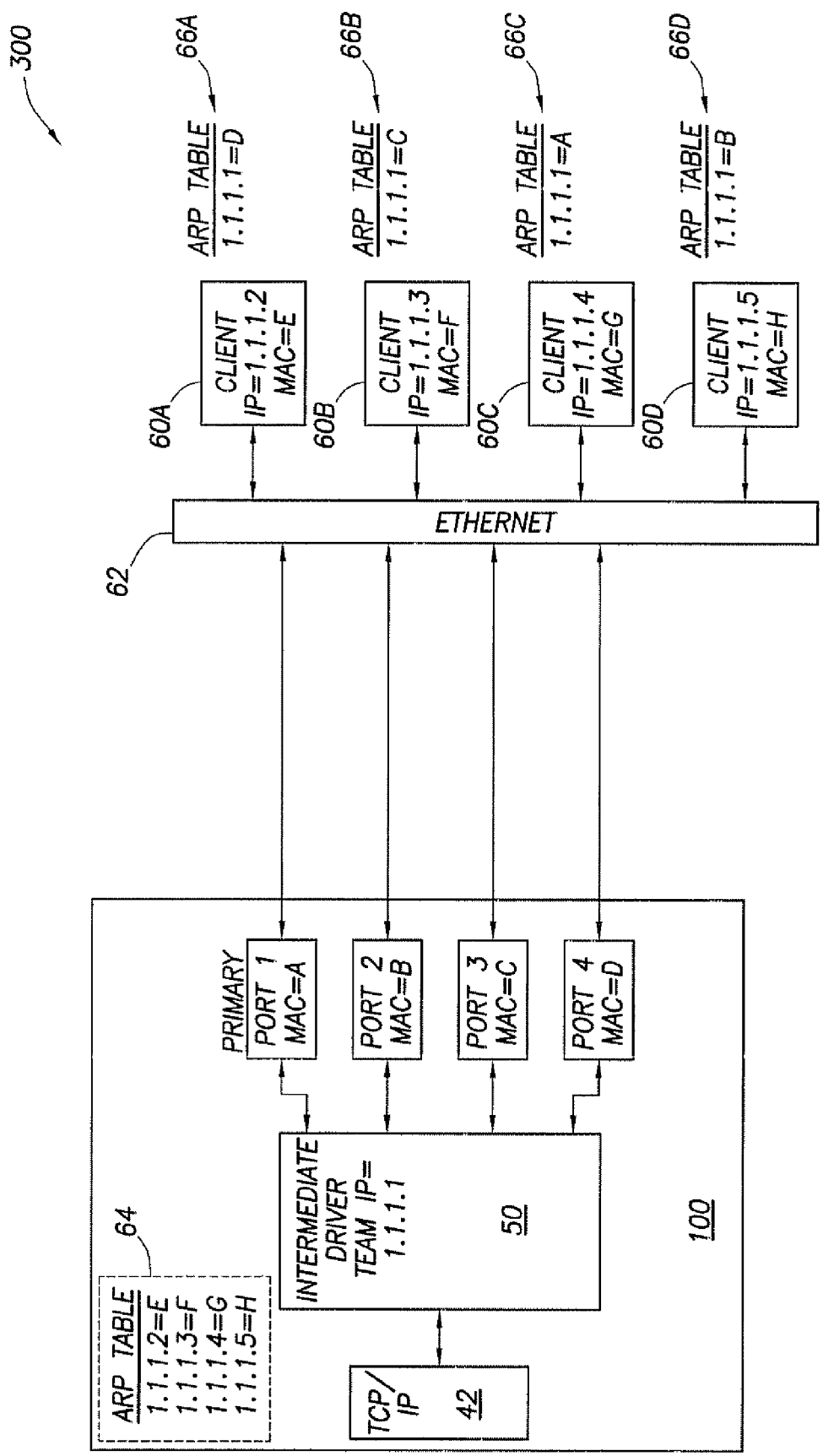
FIG. 3 illustrates a system for receive load balancing in accordance with some embodiments.

FIG. 3 illustrates a simplified system 300 in order to explain receive load balancing implemented by the intermediate driver 50. In particular, FIG. 3 illustrates computer system 100 coupled to a plurality of clients 60A-60D by way of an Ethernet communication network 62. Whether the teamed ports of the computer system 100 couple to a single switch device, or to multiple switch devices, the underlying operation of the receive load balancing is the same, and thus many of the hardware components that make up the Ethernet network 62 are omitted so as not to unduly complicate the drawing.

Consider for purposes of explanation that client 60A wishes to send a message to computer system 100. Initially, client 60A may only know the IP address of computer system 100 (e.g., by accessing a domain name server, which correlates domain names to network layer (i.e., layer 3) IP addresses). Using the illustrative IP address 1.1.1.1, client 60A sends a broadcast message to all devices on the network, the message requesting the MAC address of the device using IP address 1.1.1.1. Sending a broadcast message in this manner is referred to as an ARP request. The broadcast message may flow in any port of the teamed ports of computer system 100, but for purposes of illustration flows into the primary port, port 1. The message flows through the intermediate driver 50 to the TCP/IP stack 42. The TCP/IP stack 42 views the teamed ports as a single port, and thus is aware of only one MAC address, most likely the MAC address of the primary port. The ARP response from the TCP/IP stack 42 to client 60A is intercepted (and this process is referred to as ARP intercept) by the intermediate driver 50, and the intermediate driver may replace the MAC address supplied by the TCP/IP stack 42 with any MAC address of any of the teamed ports. Suppose that for purposes of receive load balancing that the intermediate driver 50 modifies the ARP response to utilize the MAC address of port 4 (MAC=D), rather than MAC address of the primary (MAC=A) as supplied by the TCP/IP stack. The ARP response then propagates out any of the teamed ports and eventually finds its way to client 60A, which updates its ARP table 66A to indicate that IP address 1.1.1.1 is associated with MAC address D. From that point forward, each time the client 60A wishes to communicate with computer system 100 at IP address 1.1.1.1 the client 60A initiates a layer 2 message using MAC address D, which message then flows into the computer system 100 over port 4.

Still referring to FIG. 3, now consider that client 60B likewise wishes to send a message to computer system 100. Initially, client 60B may only know the IP address of computer system 100 (e.g., by accessing a domain name server) as 1.1.1.1. Using the IP address 1.1.1.1, client 60B sends a broadcast message to all devices on the network, the message requesting the MAC address of the device using IP address 1.1.1.1 The broadcast message flows in any port of the teamed ports of computer system 100, but for purposes of illustration flows into the primary port. The message flows through the intermediate driver 50 to the TCP/IP stack 42. Again because the TCP/IP stack 42 views the teamed ports as a single port, the TCP/IP stack 42 generates an ARP response that incorporates the MAC address of which it is aware, most likely the MAC address of the primary port. The ARP response from the TCP/IP stack 42 is again intercepted by the intermediate driver 50, and the intermediate driver replaces the MAC address supplied by the TCP/IP stack 42 with any MAC address of any of the teamed ports. Suppose that for purposes of receive load balancing the intermediate driver 50 modifies the ARP response to utilize the MAC address of port 3 (MAC=C), rather than MAC address of the primary port as (MAC=A) supplied by the TCP/IP stack. The ARP response then propagates out any of the teamed ports, and eventually finds its way to client 60B. Client 60B updates its ARP table 66B to indicate that IP address 1.1.1.1 is associated with MAC address C. From that point forward, each time the client 60B wishes to communicate with computer system 1001 the client initiates a layer 2 message using MAC address C, which message then flows into the computer system 100 over port 3. A similar process continues for each client, with the intermediate driver intercepting the APP response, and replacing the MAC address with a MAC address to which the intermediate driver 50 wishes that client to communicate.

Selectively assigning MAC addresses in this manner thus implements receive load balancing on a client-by-client basis, without the necessity of having a switch with the capabilities to perform load balancing and/or without requiring that all teamed ports couple to a single switch device. However, not all ports of a set of teamed ports have equivalent data throughput and/or have equivalent connectivity to the network (either initially, or because of network failures), and receive load balancing implemented in accordance with various embodiments takes into account these differences. In order to highlight potential differences, and in particular differences in connectivity that arise because of network failures, attention now turns to FIGS. 4A and 4B.

Figure 4A:
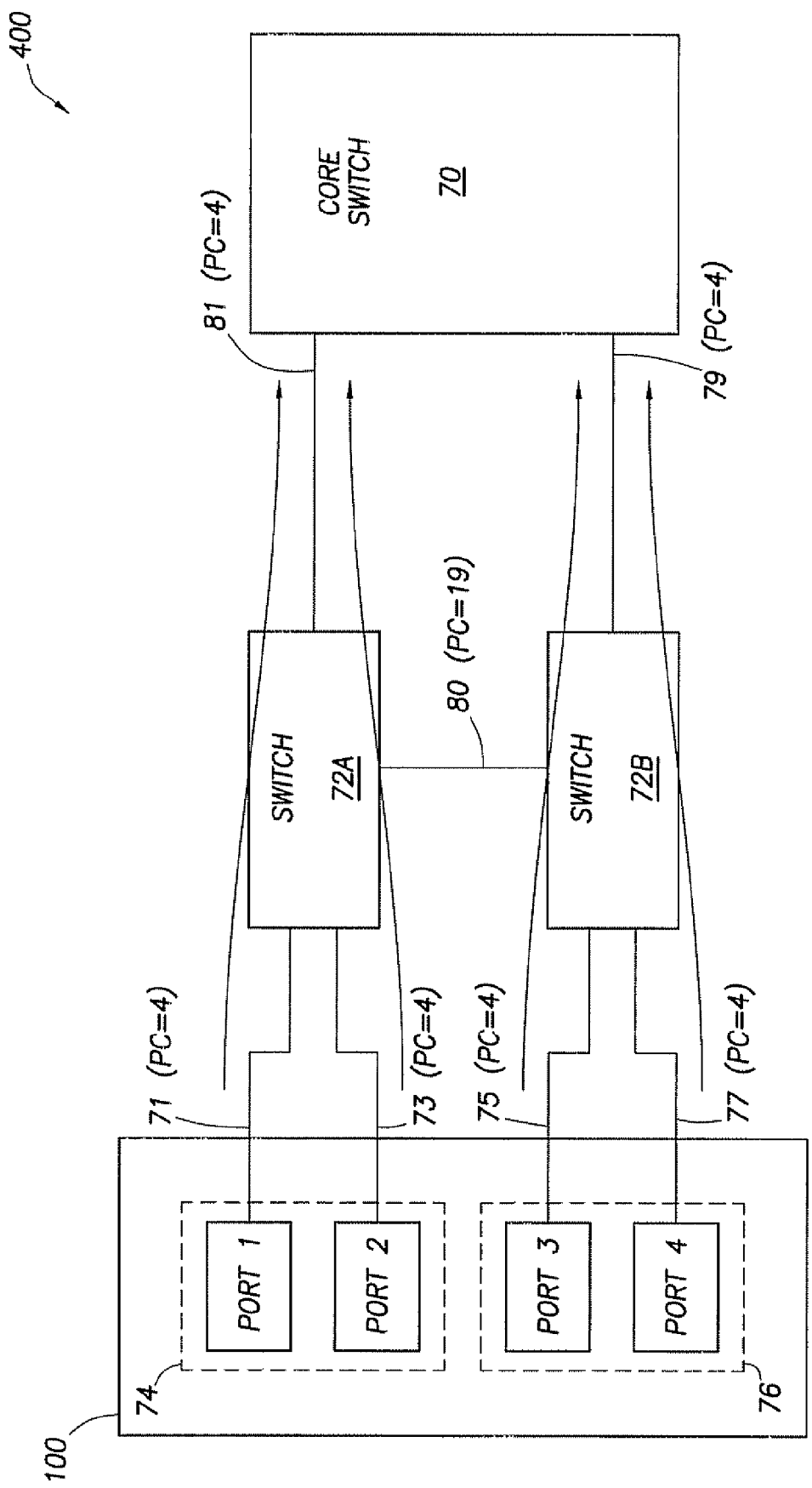
FIG. 4A illustrates a dual switch device system in accordance with some embodiments.

FIG. 4A illustrates a system 400 in accordance with at least some embodiments. In particular, FIG. 4 illustrates computer system 100 coupled to a core switch 70 of a network through two switch devices 72A and 72B. Of the four teamed ports of computer system 100, two ports couple to switch device 72A, and two ports couple to switch device 72B. FIG. 4A shows that ports 1 and 2 are implemented by a single NIC 74, while ports 3 and 4 and implemented by a single NIC 76, but this implementation is merely illustrative. The four ports may be implemented on a single NIC (but such an implementation would not provide NIC redundancy), may be implemented on four separate NICs, or any combination where for ports are available. For purpose of discussion, assume that each port couples directly to its respective switch device by way of a Gigabit connection. In particular, ports 1-4 couple to their respective switch devices 72 by way of Gigabit connections 71, 73, 75 and 77 respectively. Likewise assume that each switch device 72 couples directly to the core switch 70 by way of a Gigabit connections 79 and 81. Finally assume that switch devices 72A and 72B couple to each other by way of a 100 Mbps connection 80.

Implementing a system such as that shown in FIG. 4A provides NIC redundancy within the computer system 100 and switch device redundancy. In systems where all the ports of a set of teamed ports receive message packets, receive load balancing may be implemented by ARP intercept, as discussed above. If all the ports are operational, all physical connections are operational, and both switches 72A-72B are operational, each port of the set of teamed ports has identical connectivity to the core switch, and thus ARP intercept assignments of MAC addresses on a client-by-client basis may take an even distribution or round-robin approach.

Figure 4B:
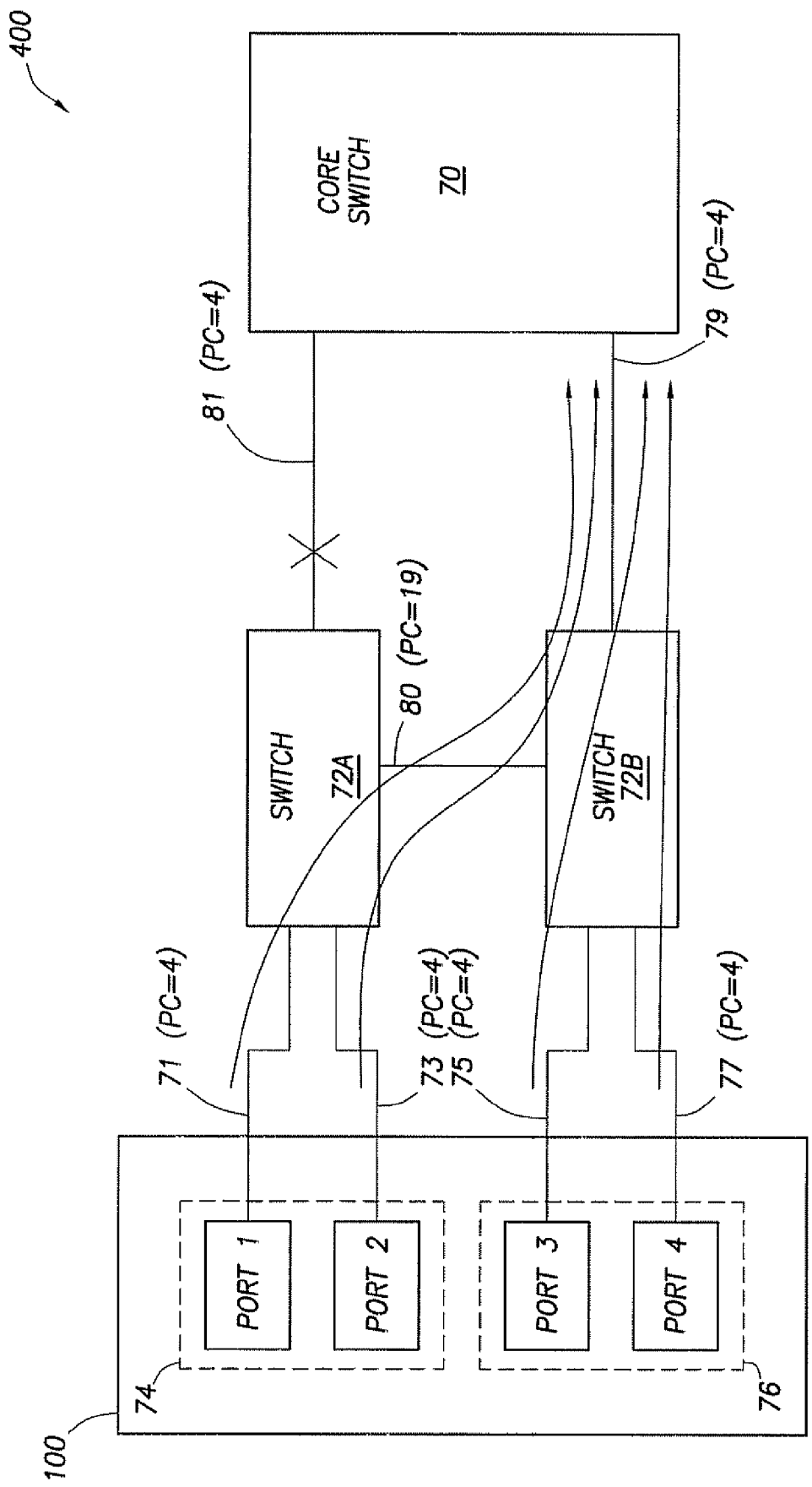
FIG. 4B illustrates a dual switch device system in accordance with some embodiments but with one failed uplink.

However, now consider the situation where the physical connection 81 between the switch device 72A and the core switch 70 is broken, as illustrated in FIG. 4B. By virtue of the 100 Mbps connection between the switch devices 72A and 72B, ports 1 and 2 will still have connectivity to the core switch 70, but the bandwidth will be severely restricted through the connection 80. In this situation, an even distribution or round-robin approach to assigning MAC address will result in assigning many clients to severely bandwidth limited ports. In order to address this difficulty, and in accordance with embodiments of the invention, assigning/reassigning MAC addresses in response to ARP requests by the intermediate driver 50 (of FIG. 2) takes into account connectivity of each port to the network. The explanation requires a brief digression into spanning tree data.

Information regarding the bandwidth of various connections between network devices on a network is often transmitted between contiguous switches on a network segment or subnet. The information is data defining a cost value for each connection in a path, the cost value being inversely related to the bandwidth and the number of hops of the connection (i.e., the cost value is lowest for those connections with the highest bandwidth and least number of hops, but the cost value does not necessarily relate to a dollar value to use the connection). The cost of a path will be the cumulative cost for all of the connections in the path. For Ethernet networks, a standard for defining this information, and a protocol for transmitting the information between the switches, is known as Spanning Tree and is specified under ANSI/IEEE Std 802.1D.

In at least some embodiments, upon forming a team of ports the intermediate driver 50 establishes an address used to receive the Spanning Tree cost information in accordance with the 802.1D specification from the switches 72A and 72B. The cost information is transmitted in the form of data called Bridge Protocol Data Units (BPDU). The intermediate driver 50 extracts from the Spanning Tree frames the data defining the cost values for the paths to which its member's ports are attached. Intermediate driver 50 then makes MAC address assignments responsive to intercepted ARP requests, with the number of clients assigned to a particular port proportional to the cost data. The intermediate driver 310 continues to monitor the Spanning Tree data, and whenever the relative costs of the paths to which the team of ports is coupled changes the intermediate driver 50 likewise changes the proportion of new clients assigned to each port proportional to the cost data.

In FIG. 4A, all four paths to the core switch 70 have equal cost. In the illustration of FIG. 4A, ports 1-4 couple to the switch devices 72 over Gigabit connections. Likewise, the uplinks between switch devices 72 and the core switch 70 are also Gigabit. Each Gigabit connection may be assessed an equal port cost (PC) value 4 by the Spanning Tree Protocol, which makes the cumulative cost of each path the same (i.e., path cost=8). The link 80 between switch devices 72 is in a standby mode when the uplinks to the core switch 70 are operational. Nevertheless, Spanning Tree assesses this 100 Mbps link a port cost=19, reflective of its significantly lower bandwidth.

In FIG. 4B, a failure in the uplink 81 between switch device 72A and the core switch 70 activates link 80 (port cost=19) to maintain connectivity between switch device 72A and the core switch 70. As a result, the new cumulative cost for ports 1 and 2 to reach the core switch goes from path cost=8 to path cost=27 (4+19+4), while the cost for ports 3 and 4 to reach the core switch remains at path cost=8. When the intermediate driver 50 becomes aware of a cost differential as between the ports, the assignment of MAC addresses in intercepted ARP responses is proportional to the new cost distribution. In the case of using BPDU information as the measure of cost, the number of clients assigned to each port is inversely proportional to the BPDU data for that port (i.e., the lower the path cost, the greater the number of clients assigned to the port).

The discussion of FIGS. 4A and 4B has assumed that each of the ports 1-4 are Gigabit ports, and that each physical connection supports Gigabit communications. In alternative embodiments, the ports 1-4 need not all be Gigabit ports, and instead one or more of the may have greater or lesser bandwidth (e.g., 100 Mbps). The differences in path cost associated with the 100 Mbps ports may evidence itself in the BPDU information, or the intermediate driver may utilize bandwidth capabilities directly in distributing MAC address in intercepted ARP replies, especially in situations where the set of teamed ports all couple to a single switch device.

Figure 5:
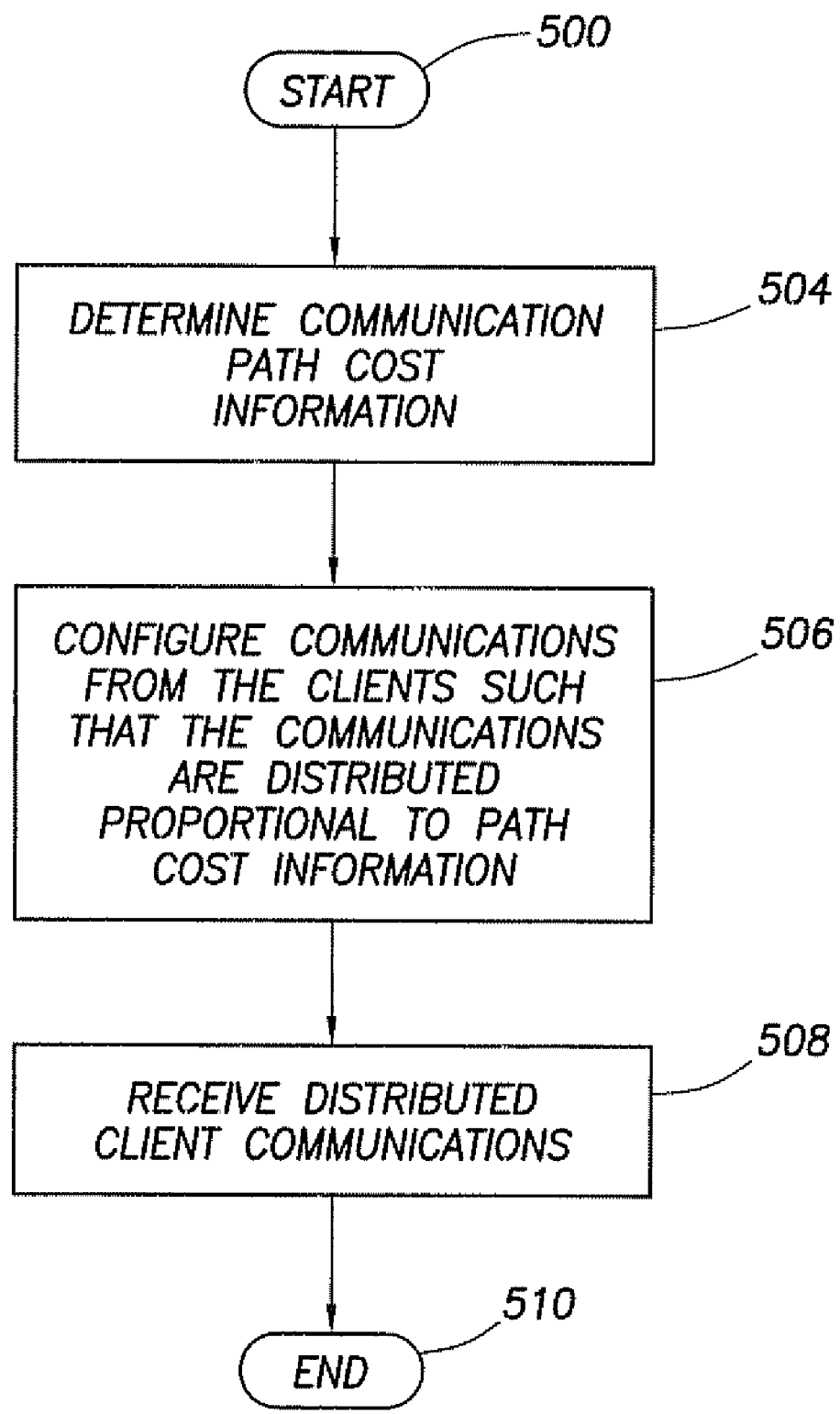
FIG. 5 illustrates a method in accordance with at least some embodiments.

FIG. 5 illustrates a method in accordance with at least some embodiments of the invention. In particular, the method starts (block 500) and proceeds to determining communication path cost information by a computer system (block 504), with the computer system coupled to a plurality of clients over a network. The determining may take many forms. In some embodiments, the path cost information is the throughput or bandwidth capability of each communication port of the computer system. In other embodiments, the path cost information is BPDU data from a Spanning Tree protocol on an Ethernet network. Path cost information need not necessarily be related to a dollar cost to use a particular port, but in some embodiments a dollar cost may form some or all the path cost information.

Regardless of the precise mechanism by which path cost information is determined, the illustrative method moves to configuring communications from the plurality of clients to the computer system such that the communications are distributed across a plurality of teamed communications ports, the distribution proportional to the path cost information associated with each port (block 506). In accordance with embodiments of the invention, configuring the communications involves intercepting ARP responses generated by a TCP/IP stack, and replacing (in some cases) the MAC address assigned by the TCP/IP stack with a MAC address of a different port of the set of teamed ports. In so doing, the client associates the IP address of the computer system with a particular port, but the association between the IP address and the MAC need not be the same for each client. Assigning the MAC addresses in the intercepted messages may be based on factors such as actual dollar cost to use a particular link, the bandwidth or throughput of a particular port, weight or preference for a particular port, error ratio of a port, and/or BPDU information gathered from Spanning Tree protocol data. Assigning MAC addresses for receive load balancing may take into account any information usable to prefer one or more ports over other ports in the same team. Thereafter, message packets are received in a distributed fashion from the various clients (block 508), and the method ends (block 510).

From the description provided herein, those skilled in the art are readily able to combine software created as described with appropriate general purpose or special purpose computer hardware to create a computer system and/or computer subcomponents embodying the invention, to create a computer system and/or computer subcomponents for carrying out the method of the invention, and/or to create a non-transitory computer-readable media for storing a software program to implement the method aspects of the invention.

The above discussion is meant to be illustrative of the principles and various embodiments of the present invention. Numerous variations and modifications will become apparent to those skilled in the art once the above disclosure is fully appreciated. For example, the receive load balancing by the intermediate driver may take place in systems where all the teamed ports couple to a single switch device, and in this case the assignments for receive load balancing may be proportional to data throughput capability of each port. Moreover, in situations where two switch devices are used and the teamed ports split among the two switch devices, the switch devices themselves may still implement receive load balancing with respect to the ports of the team coupled to the switch. It is intended that the following claims be interpreted to embrace all such variations and modifications.

What is claimed is:

1. A method comprising:
   determining communication path cost information by a computer system, the computer system coupled to plurality of clients over a network;
   configuring, by the computer system, communications from the plurality of clients to the computer system such that the communications are distributed across a plurality of teamed communication ports, the distribution proportional to communication path cost information associated with each communication port, the configuring by:
      selectively assigning media access control (MAC) addresses of the teamed communication ports in response to address resolution protocol (ARP) requests from the plurality of clients
   receiving message packets distributed across the plurality of teamed communication ports.

2. The method as defined in claim 1 wherein selectively assigning further comprises selectively assigning MAC addresses in response to ARP requests inversely proportional to each communication port's bridge protocol data units (BPDU) path cost data.

3. The method as defined in claim 1 wherein determining communication path cost information further comprises monitoring path cost information periodically transmitted by the network.

4. The method as defined in claim 3 wherein monitoring further comprises monitoring data defining the cost of each of a plurality paths between a core switch and the plurality of teamed communication ports transmitted between contiguous switches of a layer 2 network.

5. The method as defined in claim 4 wherein monitoring further comprises monitoring data generated in accordance with Spanning Tree protocol on an Ethernet network.

6. The method as defined in claim 1 wherein determining further comprises determining bandwidth of each communication port.

7. A computer system comprising:
   a processor;
   a main memory coupled to the processor;
   a plurality of communication ports coupled to the processor and configured to couple to plurality of clients over a network, the communication ports configured to be teamed;
   wherein the processor is configured to determine communication path cost information associated with each communication port, and wherein the processor configures communications from the plurality of clients to the computer system such that each client directs communications to particular communications ports of the plurality of communications ports, and wherein the communications are distributed across the plurality of communication ports proportional to communication path cost information associated with each communication port; and
   wherein when the processor configures communications the processor selectively assigns media access control (MAC) addresses of the communication ports in response to address resolution protocol (ARP) requests from the plurality of clients.

8. The computer system as defined in claim 7 wherein when the processor selectively assigns the processor selectively assigns MAC addresses in response to ARP requests inversely proportional to each communication port's bridge protocol data units (BPDU) path cost data.

9. The computer system as defined in claim 7 wherein when the processor determines communication path cost information the processor monitors path cost information periodically transmitted by the network.

10. The computer system as defined in claim 9 wherein when the processor monitors the processor monitors data defining the cost of each of a plurality paths between a core switch and the plurality of communication ports transmitted between contiguous switches of a layer 2 network.

11. The computer system as defined in claim 10 wherein the processor monitors the processor monitors data generated in accordance with Spanning Tree protocol on an Ethernet network.

12. The computer system as defined in claim 7 wherein when the processor determines communication path cost information the processor determines the communication bandwidth of each communication port.

13. A non-transitory computer-readable medium storing a program that, when executed by a processor, causes the processor to:
   interface between a communication protocol stack and each communication port of a set of teamed communication ports; and
   configure communications from a plurality of clients to the teamed communication ports such that the communications are distributed across the communication ports of the set of teamed communication ports proportional to communication path cost information associated with each communication port;
   wherein when the program configures communications the program causes the processor to selectively assign media access control (MAC) addresses of the communication ports in response to address resolution protocol (ARP) requests from the plurality of clients.

14. The computer-readable medium as defined in claim 13 wherein when the program selectively assign the program causes the processor to selectively assign MAC addresses in response to ARP requests inversely proportional to each communication port's bridge protocol data units (BPDU) path cost data.

15. The computer-readable medium as defined in claim 13 wherein the program further causes the processor to determine communication path cost information associated with each communication port.

16. The computer-readable medium as defined in claim 15 wherein when the program determines the program causes the processor to monitor data defining the cost of each of a plurality paths between a core switch and the plurality of communication ports transmitted between contiguous switches of a layer 2 network.

17. The computer-readable medium as defined in claim 16 wherein the program monitors the program causes the processor to monitor data generated in accordance with Spanning Tree protocol on an Ethernet network.

18. The computer-readable medium as defined in claim 15 wherein when the program determines communication path cost information the program causes the processor to ascertain the communication bandwidth of each communication port.

* * * * *

UNITED STATES PATENT AND TRADEMARK OFFICE
CERTIFICATE OF CORRECTION

| | |
|---|---|
| PATENT NO. | : 7,649,892 B2 |
| APPLICATION NO. | : 11/468615 |
| DATED | : January 19, 2010 |
| INVENTOR(S) | : Michael Sean McGee et al. |

It is certified that error appears in the above-identified patent and that said Letters Patent is hereby corrected as shown below:

In column 10, lines 22-23, in Claim 8, after "the processor selectively assigns" delete "the processor selectively assigns".

In column 10, line 32, in Claim 10, after "the processor monitors" delete "the processor monitors".

In column 10, line 37, in Claim 11, after "the processor monitors" delete "the processor monitors".

Signed and Sealed this

Thirteenth Day of July, 2010

David J. Kappos
*Director of the United States Patent and Trademark Office*